2,651,708

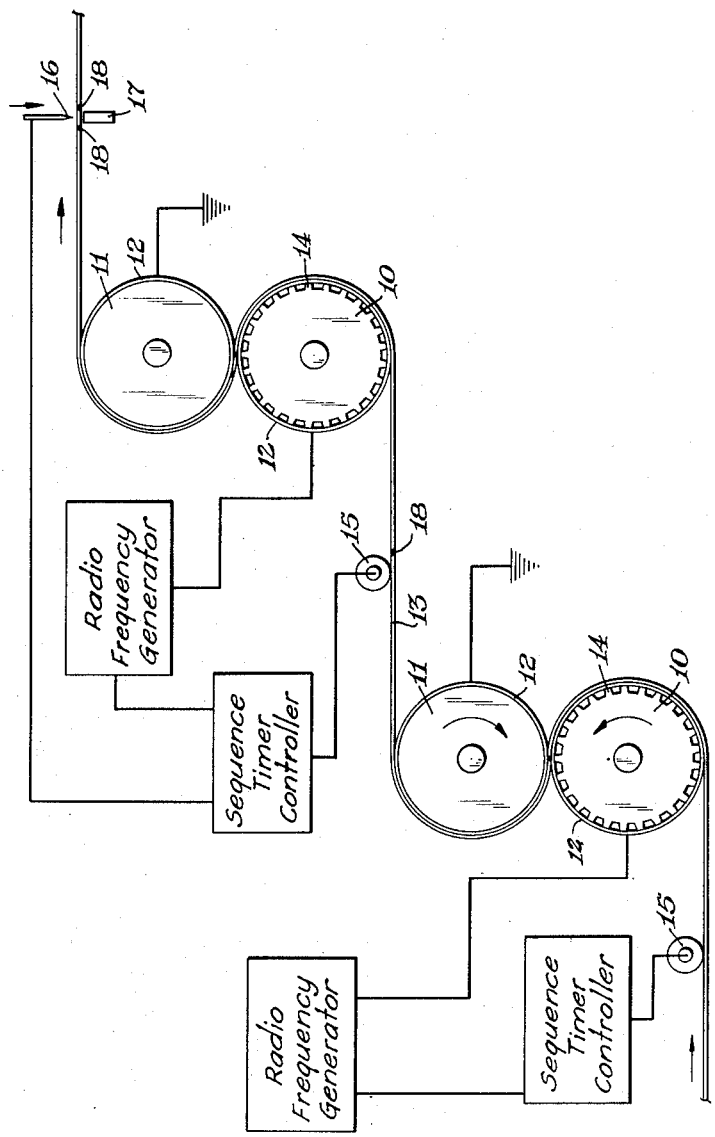
INVENTORS
Robert S. Mason
Joseph P. Graham
Harold L. Hearns
BY Griswold & Burdick
ATTORNEYS Patented Sept. 8, 1953

UNITED STATES PATENT OFFICE 2,651,708

ROTARY BAR SEALER FOR PLASTIC FILMS

Robert S. Mason, Joseph P. Graham, and Harold L. Hearns, Midland, Mich., assignors to The Dow Chemical Company, Midland, Mich., a corporation of Delaware Application December 8, 1951, Serial No. 260,608

4 Claims. (Cl. 219—47)

This invention relates to apparatus for use in making transverse welds in plural sheets of fusible organic thermoplastic film. It relates in particular to apparatus for that purpose in which the sealing bars to contact one face of the plural film assembly are mounted at spaced intervals around a rotor.

It has become common practice to weld thermoplastic films by subjecting them, while under slight pressure along the intended weld line, to the action of a radio frequency field. Commonly there is interposed between the sealing bars and the films to be welded a sheet of different composition to serve as a buffer. Such buffer sheets often become heated in the high frequency field, and, while much of their heat is transferred to the confined films being welded or to the bar electrodes, the buffer sheets become quite hot if the same area of such sheets is used repeatedly in a short time interval.

It would be desirable to make certain that when a buffer sheet is used, as described, in radio frequency welding of plastic sheets, it has an opportunity to radiate the heat which it has acquired, before the same area of the buffer is to be used again. It would also be desirable, for related reasons, to provide a means whereby the electrode used as a sealer bar has a similar opportunity to radiate any acquired heat before that bar is used again. The solution of the stated problems, and the simultaneous provision of apparatus for the rapid production, in sequence, of a large number of transverse seals in a short time in two or more overlapped sheets of plastic film is the principal object of the present invention.

In fulfillment of the foregoing and related objects, there has now been developed an apparatus comprising, as the essential elements, a pair of cylindrical rotors, one of which is longitudinally grooved so that its interrupted surface consists of a multiplicity of bars, each parallel to the axis of the cylinder and each having a land or crown having the radius of the cylinder as its radius of curvature. These bars are of equal width and equal land area, and they are evenly disposed about the cylinder with equal intervening grooves. The other cylinder may be identical with the one just described, but more conveniently it has a smooth cylindrical surface, and is disposed with its axis parallel to that of the grooved cylinder. If desired, each cylinder may be enclosed in a tight-fitting cylindrical jacket of a buffer material, suitable examples of which are synthetic rubber sheets, regenerated cellulose sheet, or any other organic coating material which will not adhere to the films to be welded at their welding temperature. One of the cylinders is electrically connected to a radio frequency generator, and the other is grounded, so that, together they constitute the electrodes between which films may be welded. Since, in most cases, a narrow weld line is desired, the lands on the grooved cylinder or cylinders are most conveniently about 0.06 to 0.10 inch wide. While wider lands may be used, it is observed that the greater their width, the greater is the tendency for the electrode and contiguous buffer sheet to become hot, and also the greater is the tendency for arcing to occur between electrodes.

The apparatus of the invention comprises several auxiliary means, each of which may take any of several well-known forms. Means are provided driving the two cylindrical electrodes at the same peripheral speed, to advance plural layers of films therebetween. Other means cause both rotary members to stop at predetermined intervals, and such means co-operate with a switch and timer means for turning on the radio frequency generator when the rotors have stopped. The timer means is set to turn off the generator after an operating time of from 0.3 to 1 second and to turn on the driving means after such an interval, to cause resumption of rotation of the electrode members, advancing the film sheets the required distance to the next zone to be welded. If the distance between welds is not evenly divisible into the circumference of the grooved cylinder, several lands or welding bars on that cylinder will be used in succession before any of them is used a second time, and each one has an opportunity to cool to room temperature, before reuse, as does the contiguous portion of the buffer sheet when such a sheet is used.

It is often convenient, when making a series of welded pouches from a double sheet of plastic film to separate adjacent pouches in the series by a double weld line, and to sever the pouches by cutting between such aired welds. For such purposes, two sets of the apparatus of the invention may be used, in series, indexed to one another in such a way that the second set of electrodes welds the films on lines parallel to and displaced a short distance from the welds applied by the first pair of rotary electrodes.

The invention will be illustrated with reference to the accompanying drawing, wherein the single figure is a diagrammatic view, partially in vertical section, showing the rotary electrodes of the invention being used, two sets in tandem, to produce regularly spaced, transverse welds between two layers of organic thermoplastic film.

Before being placed in operation, the longitudinally rabbeted cylinder 10 and the smooth cylinder 11 are each covered with a smooth cylindrical sheath 12 of a Perbunan type of synthetic rubber (butadiene-acrylonitrile copolymer) to serve as a buffer layer between the metal rotors and the film to be welded. The rabbeted cylinder 10 is connected electrically to a radio frequency generator and the smooth cylinder 11 is grounded. The two cylinders are mounted with their axes parallel, and with the buffer sheaths 12 nearly touching one another. The cylinders are mounted to be driven by any conventional means, not shown. Two or more sheets, or two or more layers of a longitudinally folded sheet of an organic thermoplastic film 13 are fed from a supply roll, not shown, partially around electrode 10, thence through the bite between rolls 10 and 11 and partially around electrode 11. This arrangement minimizes tension on and distortion or rupture of a fresh weld, giving it time to cool and become "set." If two sets of electrodes are to be used in tandem, the film discharged around roll 11 of one set becomes the feed for the other set. While electrodes 10 and 11 are at rest, the radio frequency generator is turned on for at least 0.3 second (long enough to weld the confined films) and is then turned off. The rolls 10 and 11 are rotated far enough to bring the next intended weld line into the bite between electrode 11 and a land 14 of electrode 10. This distance can be measured by known means, illustrated as an idling revolution counter 15, riding on the film 13 and connected electrically to a sequence timer-controller which is set to repeat the cycle indefinitely, so long as the revolution counter rests on the film 13. When two sets of electrodes are operated in tandem, as illustrated in the drawing, the sequence timer-controller for the second set of electrodes may be connected operatively with a cutter 16 which is positioned over an anvil 17 at the proper distance from the electrodes to sever the welded sheets between the adjacent parallel welds 18.

In a specific example, each of the rotary electrodes is 2.875 inches in diameter. The rabbeted electrode 10 has 25 longitudinal lands, or sealing bars, each about 0.094 inch wide across its arcuate face, and a like number of longitudinal grooves, separating the lands and each having a width of about 0.267 inch and a depth of about 0.094 inch. Each electrode is jacketed with a tight fitting sheath 12 of a Perbunan type of synthetic rubber, about 0.01 inch thick, to serve as a buffer between the electrodes and the film to be welded. It is desired to form parallel welds about 6.25 inches apart in a single folded sheet of a vinylidene chloride vinyl chloride copolymer film initially 20 inches wide, so as to make pouches about 6.25 inches wide and 10 inches deep. Two sets of electrodes, operating in tandem, are indexed so that each makes welds 6.5 inches apart, using each 18th land on the rabbeted electrodes 10, the second set of electrodes making its welds 0.25 inch from those produced by the first set of electrodes. The sequence of operations is that described above. Welding is effected by a radio frequency field operating at a frequency of 30 megacycles per second. Each weld requires about 0.4 second, and about 0.4 second more is consumed in advancing the folded film 13 the predetermined 6.5 inches to the next welding position. In this manner, 75 welds are made each minute by each pair of electrodes, and, in settled operation 75 pouches of the desired dimensions are made each minute. In usual commercial operation, with automatically operated bar type sealers, about 40 welds per minute has been the limit, so that, when double welds are desired, only about 20 pouches are made each minute. In the present example, using each 18th electrode bar for successive welds, each of the 25 bars is employed once before any of them is used again. Hence, each bar is used only three times per minute, and the bars 14 and adjacent portions of the buffer sheath 12 have ample opportunity to cool between successive appearances in the welding zone. Each weld line produced by the slightly crowned bars 14 and the cylindrical roll 11 can be described as a "gradient seal," being more thoroughly fused and pressed together along its center line than at its lateral edges. Such a weld has recognized advantages over one produced between flat electrodes under uniform pressure across the weld area.

We claim:

1. In apparatus for making transverse linear welds in plural thicknesses of organic thermoplastic film, a pair of coacting rotatable cylindrical metal electrodes, at least one of which is longitudinally rabbeted to provide on its surface a multiplicity of narrow lands and intervening grooves regularly disposed about the cylindrical surface, one of said electrodes being grounded and the other being connected electrically to a radio frequency generator; means for feeding organic thermoplastic film to be welded between the electrodes; means for driving the two cylindrical electrodes at the same peripheral speed; means to interrupt rotation of both electrodes after a predetermined angle of rotation while one of the transverse lands on the rabbeted cylinder is in pressure relationship through film to be welded with the other cylinder, said angle of rotation between stopping points not being evenly divisible into 360°; means for actuating the radio frequency generator only when rotation of the electrodes is interrupted; and time-actuated means for resuming rotation of the electrodes after interposed films have been welded in the high frequency field under the pressure existing between the electrodes.

2. The apparatus claimed in claim 1, wherein each of the rotatable cylindrical electrodes is provided with a tight fitting cylindrical sheath of organic sheeting which will not adhere to the films to be welded at or below their welding temperature, to serve as a buffer between the the said films and the metallic electrodes.

3. The apparatus claimed in claim 1, wherein one cylindrical electrode is smooth, and the other is rabbeted.

4. The apparatus claimed in claim 1, wherein the lands on the rabbeted cylinder are from 0.06 to 0.10 inch wide, and the intervening grooves are wider than the lands.

ROBERT S. MASON.
JOSEPH P. GRAHAM.
HAROLD L. HEARNS.

References Cited in the file of this patent

UNITED STATES PATENTS

| Number | Name | Date |
|---|---|---|
| 2,459,260 | Brown | Jan. 18, 1949 |
| 2,525,356 | Hoyler | Oct. 10, 1950 |
| 2,583,709 | Rykert | Jan. 29, 1952 |
| 2,589,777 | Collins | Mar. 18, 1952 |